United States Patent [19]

Vazirani

[11] 4,228,438
[45] Oct. 14, 1980

[54] VIDEO JET PRINTER PROCESS WITH RADIATION CURED INK

[75] Inventor: Hargovind N. Vazirani, Stirling, N.J.

[73] Assignee: Bell Telephone Laboratories, Incorporated, Murray Hill, N.J.

[21] Appl. No.: 20,532

[22] Filed: Mar. 14, 1979

Related U.S. Application Data

[63] Continuation-in-part of Ser. No. 965,777, Dec. 4, 1978, abandoned, which is a continuation of Ser. No. 793,861, May 4, 1977, abandoned.

[51] Int. Cl.³ .............................................. G01D 15/18
[52] U.S. Cl. .................................... 346/1.1; 260/42.14; 260/42.15; 204/159.22; 526/301; 526/313; 528/75; 528/93; 528/102; 528/113
[58] Field of Search ............... 204/159.15, 159.16, 204/159.19, 159.14; 106/20, 23; 346/1, 75; 427/54

[56] References Cited

U.S. PATENT DOCUMENTS

| | | |
|---|---|---|
| 3,713,864 | 1/1973 | Ackerman et al. .......... 204/159.19 X |
| 3,772,171 | 11/1973 | Savageai et al. ................ 204/159.19 |
| 3,881,942 | 5/1975 | Buchwalter ............................ 106/23 |
| 4,136,076 | 1/1979 | Daniels ................................. 346/75 |
| 4,153,467 | 5/1979 | Yano et al. ............................ 106/20 |

Primary Examiner—Murray Tillman
Assistant Examiner—A. H. Koeckert
Attorney, Agent, or Firm—Walter G. Nilsen

[57] ABSTRACT

A jet electrostatic printing process is described which uses a unique ink formulation suitable for use on certain dark colored surfaces. This process provides rapid, automatic, non-contact printing with high contrast on dark-colored surfaces. It is particularly suitable for marking cable with dark sheathing such as carbon-doped polyethylene.

30 Claims, 2 Drawing Figures

VIDEO JET PRINTER PROCESS WITH RADIATION CURED INK

CROSS-REFERENCE TO RELATED APPLICATION

This application is a continuation-in-part of my co-pending application, Ser. No. 965,777, filed Dec. 4, 1978 now abandoned, a continuation of Ser. No. 793,861, 05/04/77, now abandoned.

BACKGROUND OF THE INVENTION

1. Field of the Invention

The invention is a video jet printing process employing a unique ink composition.

2. Description of the Prior Art

Various printing processes are extensively used in commerce both for communication purposes and for marking goods. With increased sophistication and speed in manufacturing various articles, more sophisticated, flexible and rapid printing processes are needed. In addition, advances in computer technology and speed have increased the need for higher-speed printing processes to handle large data output at computer terminals.

One of the problems involved in the adoption of more sophisticated and rapid printing processes is the development of inks which are compatible with the printing process and have sufficient contrast with the surface being printed to be useful. Indeed, even adherence to surfaces is a major problem, particularly where various plastics and polymers are involved. A typical example is marking cable sheathing made of carbon-filled polyethylene.

The video jet printing process is an advantageous procedure for marking and printing on certain articles. This procedure exhibits high speeds, is automatic and does not require contact with the surface being marked. It has no moving parts and requires a minimum of printed attention. Printing may be carried out on irregular surfaces with good results.

In summary, the video jet printing process is well suited to many printing applications including, for example, marking sheathing on wire cable.

An understanding of the invention is facilitated by a description of the video jet printing system. An ink stream is developed under pressure at a nozzle assembly. This stream is modulated at ultrasonic frequencies so as to produce droplets of more or less uniform size. The droplets are directed toward the substrate to be printed. The electric charge is transferred to some of the drops in a predetermined way so that they are deflected appropriately during subsequent passage between high voltage plates. This deflection controls the vertical axis landing pattern since the deflection is proportional to the charge on ink drops. Horizontal axis spacing is controlled by frequency of strokes and the speed of the substrate. Uncharged drops are returned to the ink reservoir.

Inks usually consist of dyes dissolved in a suitable solvent such as methanol. Such an ink system is satisfactory where the background is light in color or transparent, but for dark backgrounds the contrast is insufficient. In addition, other restrictions of the characteristics of the ink system are imposed by the nature of the video jet printing system and the nature of the surface being printed. For example, each droplet of the ink produced by the print system should be approximately the same weight to be compatible with the deflection system. Some mechanism should be provided so the ink will adhere to the surface being printed. The color should be light (white or yellow) so as to produce contrast with the dark background. The viscosity should be low (preferably less than 10 cps) so as to be compatible with the printing system. The ink should be soluble in polar solvents like methanol.

SUMMARY OF THE INVENTION

The invention is a jet electrostatic printing process in which an ink of unique formulation is used. The ink is particularly suitable for jet printing and printing on dark-colored or black surfaces. The ink is a solution of radiation-curable prepolymer with pigment suspended in the solution. Various pigments may be used including $BaSO_4$ and $ZnO$, but $TiO_2$ is preferred because of greater hiding power (high refractive index). Composition of the prepolymer is adjusted so that on curing, its properties will be compatible with the surface being printed. For example, elastic modulus is preferably within a factor of two of that exhibited by the surface being printed (10,000–50,000 psi for many polymer surfaces). The cured polymer is flexible and has an elongation of at least 10 percent. Other components may also be contained in the ink, such as antisettling agents, titanium and silane coupling agents, diluting agents (generally methanol and toluene), small amounts of ionizing agent (generally ammonia), and a sensitizing agent. The jet electrostatic printing process practiced in accordance with the invention produces rapid printing with good contrast even on dark or black surfaces.

DETAILED DESCRIPTION

Figure 1:
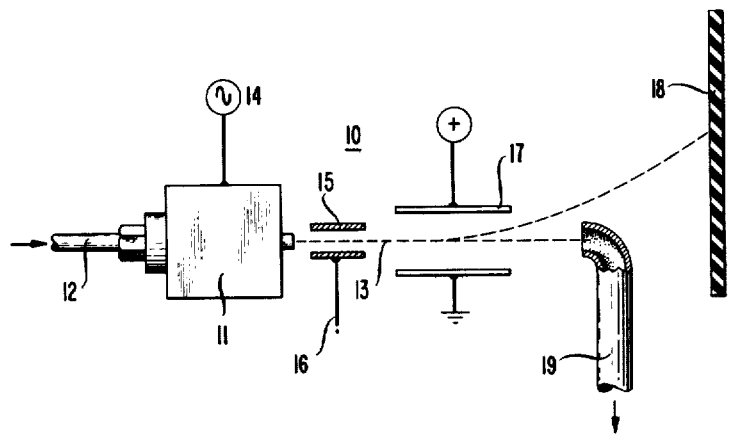
FIG. 1 shows a diagramatic sketch of a jet electrostatic printer.

In its broadest aspects, the invention is a video jet prnting process with a unique type of ink. The ink comprises radiation-curable prepolymer, pigment, certain additives such as coupling agents, surface modifiers, antisettling agents, solvents and conductivity-enhancing material (ionizing agent). Also, other agents may be included such as a stabilizer and photosensitizer.

(a) The Prepolymer

In general, the prepolymer may be any compound or mixture of compounds which can be radiation cured with physical and chemical properties suitable for attachment to the surface being printed and which, together with the other ingredients of the ink, is compatible with the video jet printing system. The prepolymer system should have preferably some polar groups so that it will have reasonable solubility in the polar organic solvents (e.g., methanol, ethanol) used in the printing process. Polar organic solvent includes liquids with one to four carbon atoms and polar groups such as hydroxyl, nitro, amino, halogen, carboxylic and ketone groups. The solvent may be a mixture of various polar organic liquids although a single liquid (e.g., methanol, ethanol, etc.) is generally preferred. Also, the prepolyer molecule contains groups which polymerize on exposure to radiation (generally ultraviolet light). These photopolymerizable groups are generally double bonds (often carbon-carbon double bonds).

Particular prepolymers are made by chemically reacting epoxy compounds and preurethane compounds with various compounds containing photopolymerizable groups such as double bonds.

Two exemplary prepolymer systems are the epoxy-acrylate system and the urethane-acrylate system (either single components or mixtures). These systems can be tailored so as to result in radiation-cured polymers with certain desirable mechanical properties. These mechanical properties are elastic modulus between 2000 and 50,000 psi for relatively low modulus substrates and 2000-500,000 for relatively tough substrates and elongation of at least 10 percent. Elastic modulus and elongation are preferably matched to the surface being printed and in most instances should be between 5000 and 15,000 psi for elastic modulus and at least 20 percent for elongation. Generally, the prepolymer should be polar to permit significant solubility in polar solvents such as methanol for use in the jet electrostatic printer. A polar solvent is used in the jet electrostatic printer because droplets used in the printing process are electrically charged. Also, the polar solvent preferably should be fairly volatile to insure rapid evaporation after printing on the surface to be printed. These mechanical properties are obtained with a single epoxy-acrylate or urethane-acrylate system, but it is usually more convenient to use a multicomponent epoxy-acrylate or multicomponent urethane-acrylate system.

For example, with the epoxy-acrylate system, aromatic glycidyl ethers, when reacted with acrylic acid systems and radiation cured tend to form hard, brittle, high elastic modulus polymers whereas aliphatic glycidyl ethers form soft, rubbery, high elongation-low elastic modulus polymers. Excellent prepolymers for the practice of the invention are made by mixing suitable amounts of aromatic and aliphatic glycidyl ethers together to achieve the desired mechanical properties. Many aromatic and aliphatic glycidyl ethers are well known and described in the polymer literature. Some are described by Henry Lee and Kris Neville in *Handbook of Epoxy Resins*, McGraw-Hill, New York, especially Chapter 2. Diglycidyl ethers of aromatic or aliphatic compounds (or both) are preferred for two reasons. First, the cured polymer has more desirable properties. The greater polarity of the prepolymer permits greater solubility in the polar solvent and greater compatibility with the jet electrostatic printing system.

Excellent results are obtained with 1,4-butanediol diglycidyl ether and a diglycidyl ether of an aromatic compound such as bisphenol A, substituted bisphenol A and particularly chlorinated or brominated bisphenol A. Monobromo bisphenol A gives excellent results in terms of properties of the radiation-cured prepolymer compatibility with the printing system and solubility of the prepolymer in polar solvents.

In its more general form, the prepolymer is formed by reacting the epoxy compound with a double-bond compound which will yield a photopolymerizable prepolymer. This may be achieved by reacting the epoxy compound with an acrylic acid derivative (including acrylic acid itself) to form the epoxy-acrylate prepolymer. Various acrylic acid derivatives may be used but usually acrylic acid and/or methacrylic acid is preferred because of easy availability and good results.

The epoxy-acrylate system may contain two other ingredients useful in making the prepolymer. These components, although not necessary to the practice of the invention, make it easier to carry out the reaction between glycidyl groups and carboxylic acid groups and minimized unwanted polymerization of the double bond. First, a catalyst may be used to enhance reaction of the glycidyl ether group on the epoxy and the carboxylic acid group of the acrylic acid. Various catalysts are described in the above-mentioned reference by Lee and Neville, especially in Chapter 8, 9, 10, 11 and 12. Diethylaminoethanol and dimethylaminoethanol are particular examples.

A stabilizer is also used to prevent polymerization of the double bond during the formation of the prepolymer. Various stabilizers may be used such as the methyl ether of hydroquinone, tertiary butyl catechol, etc. Hydroquinone is preferred because of low cost, easy availability and excellent results obtained.

The epoxy compound or compounds are mixed with the acrylic acid compound together with catalyst and stabilizer if used and the mixture stirred and heated if necessary to promote reaction. Generally, the reaction is carried out until the acid value [mg KOH needed to neutralize 1 gm reactants ] is less than one.

A particular example serves to illustrate the use of this type of prepolymer. The following ingredients are mixed together: 40-41 weight percent monobromo bisphenol A, 33-34 weight percent 1,4-butanediol diglycidyl ether and 26-27 weight percent acrylic acid. Added to this mixture is 0.1 to 0.3 parts per hundred (phr) diethylaminoethanol and 0.1 to 0.3 phr hydroquinone. This entire mixture is heated in a flask at from 100-150 degrees C. until the reaction has proceeded to where the acid value is less than 1.0.

In another example, the 40-41 weight percent monobromo bisphenol A is substituted with 28-29 weight percent diglycidyl ether of bisphenol A and 12-13 weight percent of glycidyl ether of dibromophenol.The remainder of the process is carried out as above. Because the epoxy equivalent weight varies from batch to batch, the above compositions may vary accordingly. Such a composition is 10.5 to 12.5 weight percent of glycidyl ether of dibromophenol, 24-28 weight percent of diglycidyl ether of bisphenol A, 31-37 weight percent 1,4-butanediol diglycidyl ether and 26-29 weight percent acrylic acid. The remainder of the experiment is carried out as above.

Another example is as follows. 20-30 weight percent of diglycidyl ether of bisphenol A, 40-50 weight percent of 1,4 butanediol diglycidyl ether and 28-35 weight percent acrylic acid. The remainder of the example is carried out as above.

Another prepolymer system which is useful in the practice of the invention is the urethane-acrylate prepolymer system. Again, composition is adjusted so that the radiation-cured polymer has the mechanical properties outlined above the system and is compatible with the jet electrostatic printing system. Single urethane-acrylate systems may be used to achieve these requirements. More frequently, these properties are more conveniently obtained from mixtures of urethane-acrylate systems. Often, the systems contain prepolymers that cure into rubbery polymers such as aliphatic isocyanate-acrylates and prepolymers which cure into hard polymers such as aromatic isocyanate-acrylates. Typical aliphatic and aromatic isocyanates are given in various parts of the scientific literature such as *Advances in Urethane Science and Technology*, Vol. 1 and 2 by K. C.

Frisch and S. L. Reegen, Technomic Publishing, Stamford, Conn.

Particularly advantageous are diisocyanate compounds because the resulting prepolymer is more soluble in polar solvents. Examples are given in the above references.

The isocyanates are reacted with a hydroxyl containing acrylate compound to form the prepolymer. Various hydroxy acrylates may be used provided the compound contains at least one hydroxy group, has no more than 15 carbon atoms and no more than 4 hydroxy groups. Particular examples are hydroxyethylmethacrylate and hydroxypropyl-methacrylate.

The mechanical properties of the cured polymer may be altered by the addition of organic hydroxyl compounds. The addition of long chain (4–15 carbon atoms) monohydroxyl compounds makes the cured polymer softer, more rubbery, with lower elastic modulus and greater elongation. The addition of short-chain (6 carbons or less) dihydroxyl the organic compounds or trihydroxy organic compounds makes the cured polymer harder, with higher elastic modulus.

The ingredients, isocyanate, hydroxy acrylate and optionally organic hydroxy compound are reacted together with a catalyst to form the prepolymer. Various catalysts and mixed catalysts are discussed in Chapter 1, volume 1, of the above reference. Stannous octoate catalyst yields particularly good results. Generally, the reaction is carried out until at least 90 percent of the isocyanate groups are reacted. Often, essentially complete reaction is preferred because of the excellent mechanical and chemical properties obtained.

A number of examples might serve to illustrate the prepolymer system.

EXAMPLE 1

A quantity of 168 gms of 1,6-hexamethylene diisocyanate (HDI) is reacted with 273 gms of hydroxyethylmethacrylate in the presence of stannous octoate catalyst until nearly all (at least 90 percent by weight) the isocyanate is reacted. Moderate amounts of heat as well as mixing may be used to promote the reaction.

EXAMPLE 2

The same as example 1 except that 302 gms of hydroxypropylmethacrylate is used in place of the hydroxyethylmethacrylate.

EXAMPLE 3

A quantity of 174 gms of toluene diisocyanate (TDI) are reacted with 102 gms of hexanol until essentially all the hexanol is reacted. Then, 143 gms of hydroxyethylmethacrylate are added and reaction carried out until nearly all (at least 90 percent by weight) the isocyanate is reacted. Moderate heat and mixing may be used to promote the reaction.

(b) The Pigment

Various pigments well known in the art may be used including zinc oxide, barium sulfate, and titanium oxide. Titanium oxide is preferred because of its greater hiding power, easy availability and suitable particle characteristics. Quite wide variations in amount of pigment are permitted (say from 5–50 weight percent of prepolymer) but best results in terms of cured polymer properties and hiding power are obtained with 10–30 weight percent. Because of the nature of the jet electrostatic printing or video jet printing system the pigment should be used in a particular physical form especially regarding particle size. Small particle size is preferred; generally, it is advantageous if 90 percent by weight of the pigment have an agglomerate size less than 40 microns.

Pigments obtained commercially should be processed in such a way as to reduce their particle size to some small value preferably less than 40 microns. For example, titanium dioxide obtained commercially (as for example from American Cyanamid Company with oil absorption less than 40) is processed usually by grounding (ball milling, sand milling, etc.,) usually for times between one hour and 100 hours or more so as to achieve small particle size.

Pigment particle size less than five microns is generally preferred because it is relatively easily achieved and ensures uniform droplet weight. Generally, it is sufficient that 90 percent of the pigment have particle or agglomerate size less than five microns.

A particularly convenient way of both achieving small particle size for the pigment and insuring good uniform mixing of the ink is to add together the ingredients of the ink and then mixing preferably by grinding and/or ball milling the components together. The pigment, prepolymer and polar solvent are mixed together. The polar solvent should be suitable for dissolving the prepolymer and be compatible with the jet electrostatic printer. Typically, methanol is used. Optionally, a nonpolar solvent such as toluene may be added. Since methanol is particularly suitable for use in the printer, its use at this stage is also convenient. The nonpolar solvent is added to promote a small amount of dissolution of the surface being printed. Such dissolution of the surface being printed is believed to lead to greater adherence of the ink to the surface.

For smaller character size and/or clearer printing (greater separation of individual drops), drop size should be reduced to 50 microns or even 20 microns for especially small print character size. Droplet weight should be uniform to ensure that each droplet can be accurately deflected to a given predetermined point. To ensure uniform weight distribution, the size of the pigment particles should be small compared to droplet size. Generally, this requires that pigment particle size is less than approximately 1/20th of the droplet size. For a droplet size of 50 microns, this requires pigment particle size to be less than approximately 2.5 microns. For a droplet size of 20 microns, pigment particle size should be less than about one micron. Since considerable error can be tolerated in the printing process, only about 60 percent of the pigment particles must meet this requirement although 90 percent yields clearer and more efficient printing.

(c) Additives

In addition to the above, it is preferred that small amounts of antisettling agent, silane coupling agent and titanium coupling agent be added to the mixture. Aromatic solvent may also be added to give solvent balance and keep the pigment in the diluted ink from settling or agglomerating. Suitable antisettling agents are disclosed in the literature. A typical example is titanium di(octylphosphate)oxyacetate. Various silane coupling agents are also well known in the literature. The chemical formula of a typical silane coupling agent is given below.

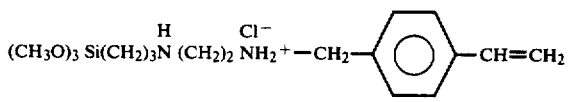

Various titanium coupling agents are also well known from the literature. A typical example is tetra(2,2 diallyloxymethyl-1-buteneoxy) titanium di(di-tridecyl)-phosphite. Concentrations of the various components making up the ink may vary over wide limits.

Excellent results are obtained using for every 100 phr prepolymer, 10-30 phr pigment, 0-20 phr nonpolar solvent, 0-20 phr polar solvent, 0-1 phr antisettling agent, 0.01-1 phr silane coupling agent and 0-1 phr titanium coupling agent. The mixture is then ground (e.g., by ball milling or sand milling) to achieve uniform mixing and small particle size.

Prior to use in the jet electrostatic printer, the ink is preferably diluted down with polar solvent and ionizing substance added. Ionizing substance is added to make the ink more conductive and to permit the ink to accept electric charge more readily. Ammonia is a preferred ionizing substance. More preferably, the polar solvent should be mixed with some aromatic solvent, generally up to 20 volume percent aromatic solvent. The aromatic solvent is generally toluene. Dilution should continue until the viscosity is preferably less than 10 cps. A dilution between 100 and 200 volume percent often gives a good compromise between suitability for the jet electrostatic printer and density of the printing on the surface to be printed. A photosensitizer is also added to promote photopolymerization of the prepolymer. Generally, a photosensitizer active in the ultraviolet region is preferred since it allows exposure of the ink-diluent mixture to ordinary (visible) light without adverse effects. Photosensitizers like benzoin isobutyl ether and diethoxyacetophenone give excellent results. Typical concentrations are 0.1 to 5 weight percent based on diluted ink.

Various photosensitizers may be used, many of which are described in the literature. (See, for example, "Aromatic Keto Compounds as Initiators in Photopolymerizations" by H. G. Heine et al, *Angew Chemical International Edition*, Volume 11, No. 11, page 974 (1972). Particularly convenient are various aromatic keto compounds including benzoin and some of its derivatives (methyl and isobutyl ethers) as well as benzil and derivatives.

Typical compositions which yield excellent printing results with the jet electrostatic printer were 30-60 weight percent ink, 40-70 weight percent polar solvent. The polar solvent preferred is methanol with 0.01 to 1.0 weight percent ammonia and 0.01 to 5 weight percent photosensitizer.

Before use in the jet electrostatic printer, the diluted ink is preferably filtered (sometimes internally in the jet electrostatic printer) to remove particles (including pigment) larger than 20-40 microns. Where smaller particle size is desired, a correspondingly smaller filter size (five microns or one micron, for example) may be used. After printing, the ink is cured by exposure to radiation. Where photosensitizer is used, it is preferred that much of the radiation be in the spectral range (frequency or wavelength range) where the photosensitizer is highly sensitive. An medium pressure ultraviolet lamp is generally used, typically with a power output of 200-300 watts per linear inch and a length of up to six feet. With cable marking, the cable may be run along the length of the lamp after printing.

An understanding of the invention is facilitated by a description of the operation of a jet electrostatic printer. A block diagram of a typical electrostatic printer is shown in FIG. 1. The printer 10 has a nozzle 11 into which ink is injected under pressure through the tube 12. The ink is broken up into droplets 13 by an ultrasonic vibrator (usually a piezoelectric crystal) with an applied ultrasonic signal from a signal source 14. The droplets of ink pass through a charging tunnel 15 which has applied to it a charging signal on conductor 16. The charged ink droplets pass through deflection plates 17 which either deflect the charge droplets to a particular place on the printing surface 18 or into a return tube 19 if no ink is to fall on a particular spot. The return tube returns ink to the ink reservoir.

Figure 2:
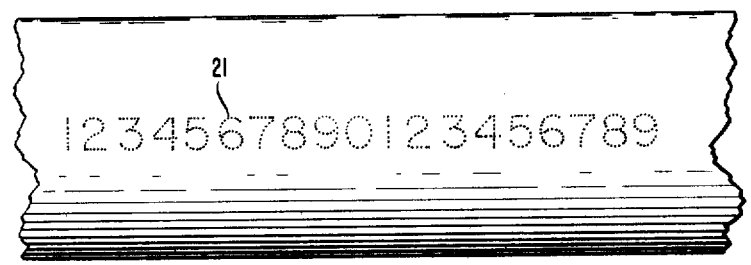
FIG. 2 shows a black, polyethylene-sheathed cable with printed numbers produced in accordance with the invention.

FIG. 2 shows a particular surface 20 (in this case a cable sheathing) with numbers imprinted 21 in accordance with the inventive process.

I claim:

1. A process for jet video printing on a surface with diluted ink using a jet video printer in which printing takes place by forming a stream of ink droplets, some of which are charged electrically and electrostatically deflected onto the surface being printed, and the diluted ink is cured with radiation after printing CHARACTERIZED IN THAT the diluted ink comprises:
   a. polar organic solvent in sufficient quantity so that the viscosity of the diluted ink is less than 20 cps in which said polar organic solvent accepts electric charge when ionizing agent is dissolved in said polar organic solvent, said polar organic solvent comprising at least one substance selected from the group consisting of methanol and ethanol,
   b. radiation-curable prepolymer which on curing yields a polymer with elastic modulus between 2000 and 500,000 psi and elongation at least 10 percent, said prepolymer having a solubility in said polar organic solvent of at least 10 weight percent,
   c. pigment in which 90 percent by weight of said pigment has agglomerate size less than 40 microns, said pigment present in amounts between 5 and 50 weight percent of the prepolymer,
   d. ionizing agent which permits the diluted ink to accept electric charge present in amounts up to the weight of prepolymer.

2. The process of claim 1 in which the polar organic solvent is methanol.

3. The process of claim 1 in which the pigment is titanium dioxide.

4. The process of claim 3 in which the amount of pigment is between 10 and 30 weight percent of prepolymer.

5. The process of claim 1 in which the prepolymer is the reaction product of at least one epoxy compound and substance containing at least one photopolymerizable group.

6. The process of claim 5 in which the substance containing at least one photopolymerizable group is acrylic acid or methacrylic acid or a mixture of both.

7. The process of claim 5 in which the epoxy compound comprises a mixture of aromatic and aliphatic diglycidyl ethers.

8. The process of claim 7 in which the epoxy compounds comprise a mixture of 1,4-butanediol diglycidyl ether and the diglycidyl ether of monobromo bisphenol A.

9. The process of claim 8 in which the prepolymer is made by carrying out a reaction between 40–41 weight percent monobromo bisphenol A, 33–34 weight percent 1,4-butanediol diglycidyl ether and 26–27 weight percent acrylic acid.

10. The process of claim 9 in which the mixture contains 0.1 to 0.3 phr diethylaminoethanol and 0.1 to 0.3 phr hydroquinone, and the reaction is carried out at temperatures between 100–150 degrees C. until the acid value is less than 1.0.

11. The process of claim 1 in which the prepolymer is a urethane-acrylate.

12. The process of claim 11 in which the urethane is prepared from a mixture of aromatic and aliphatic diisocyanates.

13. The process of claim 12 in which the acrylate is hydroxyethylmethacrylate or hydroxypropylmethacrylate or a mixture of both.

14. The process of claim 1 in which the diluted ink comprises in addition
 a. nonpolar solvent which leads to a small amount of dissolution of the surface being printed so as to promote greater adherence of the ink to surface being printed,
 b. antisettling agent,
 c. silane coupling agent, and
 d. titanium coupling agent.

15. The process of claim 1 in which
 a. the nonpolar solvent is toluene,
 b. the antisettling agent is titanium di(octylphosphate)oxyacetate,
 c. the silane coupling agent has the structural formula

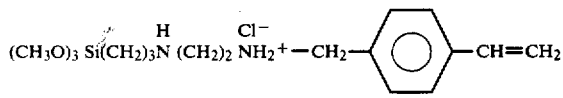

and
 d. the titanium coupling agent is tetra(2,2 diallyloxymethyl-1-buteneoxy) titanium di(di-tridecyl)-phosphite.

16. The process of claim 1 in which an undiluted ink consists essentially of
 a. 100 phr prepolymer,
 b. 10–30 phr pigment,
 c. 0–20 phr nonpolar solvent,
 d. 0–20 phr polar solvent,
 e. 0–1 phr antisettling agent,
 f. 0.01–1 phr silane coupling agent, and
 g. 0–1 phr titanium coupling agent, and said undiluted ink is diluted with polar organic solvent until the viscosity of the diluted ink is less than 20 cps.

17. The process of claim 1 in which the ionizing agent is ammonia.

18. The process of claim 1 in which the diluted ink contains photosensitizer.

19. The process of claim 18 in which the photosensitizer is either benzoin isobutyl ether or diethoxyacetophenone.

20. The process of claim 1 in which the surface is dark in color.

21. The process of claim 1 in which the surface is cable sheathing.

22. The process of claim 1 in which the radiation is ultraviolet radiation.

23. The process of claim 1 in which the radiation-curable prepolymer on curing yields a polymer with elastic modulus between 2000 and 50,000 psi and elongation at least 20 percent.

24. The process of claim 7 in which the epoxy compounds comprise a mixture of 1,4-butanediol diglycidyl ether, diglycidyl ether of bisphenol A and glycidyl ether of dibromophenol.

25. The process of claim 24 in which the prepolymer is made by carrying out a reaction between 28–29 weight percent diglycidyl ether of bisphenol A, 12–13 weight percent glycidyl ether of dibromophenol, 33–34 weight percent 1,4 - butanediol diglycidyl ether and 26–27 weight percent acrylic acid.

26. The process of claim 24 in which the prepolymer is made by carrying out a reaction between 10.5 to 12.5 weight percent of glycidyl ether of dibromophenol, 24–28 weight percent of diglycidyl ether of bisphenol A, 31–37 weight percent 1,4-butanediol diglycidyl ether and 26–29 weight percent acrylic acid.

27. The process of claim 24 in which the prepolymer is made by carrying out a reaction between 20–30 weight percent of diglycidyl ether of bisphenol A, 40–50 weight percent of 1,4-butanediol diglycidyl ether and 28–35 weight percent acrylic acid.

28. The process of claim 1 in which 90 percent of the pigment has agglomerate size less than five microns.

29. The process of claim 1 in which 60 percent of the pigment has agglomerate size less than 2.5 microns.

30. The process of claim 1 in which 60 percent of the pigment has agglomerate size less than one micron.